United States Patent
Cudak et al.

(10) Patent No.: US 9,881,269 B2
(45) Date of Patent: Jan. 30, 2018

(54) COLLABORATIVE INFRASTRUCTURE UPDATE SCHEDULING

(71) Applicant: Lenovo Enterprise Solutions (Singapore) Pte. Ltd., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 524 days.

(21) Appl. No.: 14/190,713

(22) Filed: Feb. 26, 2014

(65) Prior Publication Data
US 2015/0242801 A1 Aug. 27, 2015

(51) Int. Cl.
G06Q 10/06 (2012.01)
(52) U.S. Cl.
CPC ........... *G06Q 10/063116* (2013.01); *G06Q 10/06393* (2013.01)
(58) Field of Classification Search
USPC ........................................................ 705/7.19
See application file for complete search history.

(56) References Cited

U.S. PATENT DOCUMENTS

| | | | | |
|---|---|---|---|---|
| 6,636,888 B1 * | 10/2003 | Bookspan | ............ | G06Q 10/109 709/200 |
| 7,120,511 B1 * | 10/2006 | Tanzer | ............... | G06Q 10/06 700/100 |
| 7,130,769 B1 | 10/2006 | Allen, Jr. et al. | | |
| 7,467,161 B2 | 12/2008 | Frisina | | |
| 8,065,175 B1 * | 11/2011 | Lewis | ............ | G06Q 10/06311 705/7.16 |
| 8,463,632 B2 | 6/2013 | Niazi | | |

(Continued)

OTHER PUBLICATIONS

Disclosed Anonymously, "Self-Healing Metadata Based on Application Feedback," Aug. 11, 2011, IP.com No. IPCOM000209630D, pp. 1-2.*

(Continued)

*Primary Examiner* — Ivan R Goldberg
*Assistant Examiner* — Venay Puri
(74) *Attorney, Agent, or Firm* — Law Office of Jim Boice

(57) ABSTRACT

A method, system, and/or computer program product manages update operations for a hardware resource. A time, date, and location of the future meeting for which a predetermined feature from a hardware resource has been designated as being required for the future meeting is retrieved from a calendar. A determination is made as to whether or not the predetermined feature of the hardware resource is scheduled for updating during the time and date of the future meeting at said location. A level of detriment that will occur to the future meeting if the future meeting proceeds without the updating of the predetermined feature from the hardware resource is determined. A schedule for updating the hardware resource is then adjusted according to the level of detriment that will occur to the future meeting if the future meeting proceeds without the updating of the predetermined feature from the hardware resource.

11 Claims, 3 Drawing Sheets

(56) References Cited

U.S. PATENT DOCUMENTS

| | | | |
|---|---|---|---|
| 8,914,786 B2* | 12/2014 | Cooley | G06F 8/65 |
| | | | 717/168 |
| 2003/0158770 A1 | 8/2003 | Carlson et al. | |
| 2004/0064355 A1* | 4/2004 | Dorenbosch | G06Q 10/1095 |
| | | | 705/7.19 |
| 2006/0015386 A1 | 1/2006 | Moore | |
| 2009/0055235 A1* | 2/2009 | Oral | G06Q 10/109 |
| | | | 705/7.24 |
| 2009/0177476 A1* | 7/2009 | Darrell | G10L 15/22 |
| | | | 704/275 |
| 2010/0076973 A1* | 3/2010 | MacHida | G06F 11/3409 |
| | | | 707/736 |
| 2010/0235212 A1* | 9/2010 | Godfrey | G06Q 10/1095 |
| | | | 705/7.19 |
| 2012/0109940 A1* | 5/2012 | Ishii | G06F 17/30867 |
| | | | 707/722 |
| 2012/0136671 A1* | 5/2012 | Alt | G06F 19/327 |
| | | | 705/2 |
| 2013/0114422 A1* | 5/2013 | Clark | G06F 8/65 |
| | | | 370/252 |
| 2013/0173796 A1* | 7/2013 | Grab | H04N 21/251 |
| | | | 709/225 |
| 2015/0066813 A1* | 3/2015 | Andreatta | G06F 9/505 |
| | | | 706/11 |
| 2015/0149404 A1* | 5/2015 | Lock | H04L 65/403 |
| | | | 707/608 |

OTHER PUBLICATIONS

Disclosed Anonymously, "Method and System for Promoting System Stability by Adaptive Re-rendering of System Profile Data", Sep. 16, 2013, IP.com No. IPCOM000230867D, pp. 1-2.*

* cited by examiner

COLLABORATIVE INFRASTRUCTURE UPDATE SCHEDULING

BACKGROUND

The present disclosure relates to the field of computing hardware, and specifically to networked computer systems. Still more specifically, the present invention is related to hardware resources within networked computer systems and scheduling of their maintenance.

When a meeting or other event that requires access to a particular hardware resource within an enterprise is scheduled, that particular hardware resource is often unavailable due to its scheduled maintenance. This results in the meeting either not being able to proceed, or to proceed at a diminished capacity/level. Simply exchanging e-mails between those who need the hardware resources and personnel who maintain such hardware resources is not a feasible solution in a large enterprise, due to the numerous quantities of meetings and due to cross-references between different systems within the enterprise. For example, a person setting up a meeting may know that he needs access to Server A, but may have no idea that Server A needs to access Server B in order to work properly.

SUMMARY

A method, system, and/or computer program product manages update operations for a hardware resource. A time, date, and location of the future meeting for which a predetermined feature from a hardware resource has been designated as being required for the future meeting is retrieved from a calendar. A determination is made as to whether or not the predetermined feature of the hardware resource is scheduled for updating during the time and date of the future meeting at said location. A level of detriment that will occur to the future meeting if the future meeting proceeds without the updating of the predetermined feature from the hardware resource is determined. A schedule for updating the hardware resource is then adjusted according to the level of detriment that will occur to the future meeting if the future meeting proceeds without the updating of the predetermined feature from the hardware resource.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
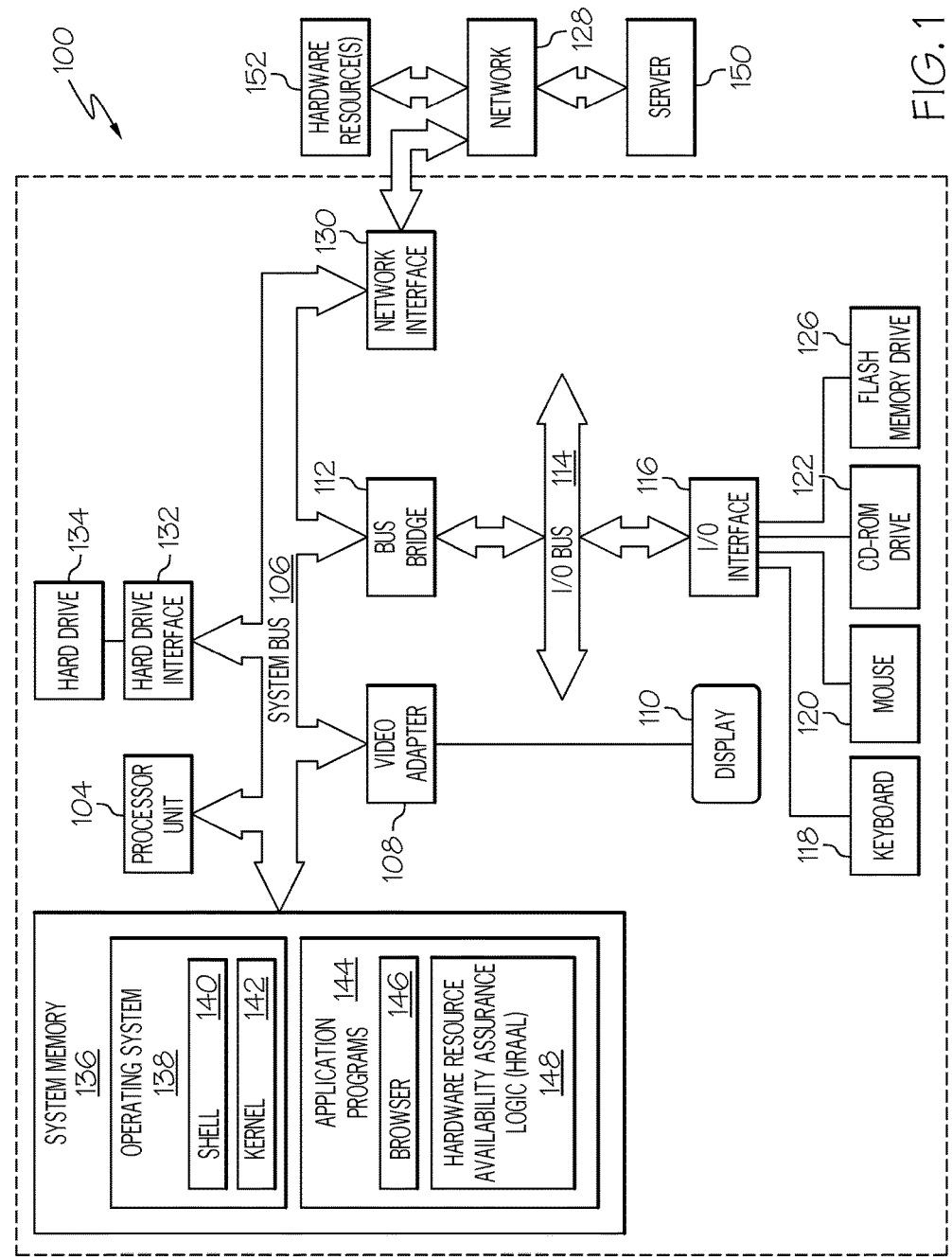
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 and/or hardware resource(s) 152 via a network 128 using a network interface 130, which is coupled to system bus 106. Network 128 may be an external network such as the Internet, or an internal network such as an Ethernet or a Virtual Private Network (VPN). In one embodiment, network 128 is a Local Area Network (LAN), including, but not limited to a Wireless LAN (WLAN) such as a Wi-Fi "hotspot". Server 150, as well as hardware resource(s) 152 (e.g., if a server), may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Hardware Resource Availability Assurance Logic (HRAAL) 148, which, in one embodiment, executes the process described below in FIGS. 2-3. In one embodiment, computer 100 is able to download HRAAL 148 from service provider server 150, preferably in an "on demand" basis.

Also coupled to computer 100 are one or more hardware resources, such as the depicted hardware resource 152. Hardware resource 152 is defined as remote hardware that is only accessible to computer 100 via network 128. For example, in one embodiment, hardware resource 152 is a server that is capable of processing and/or supplying data requested by a user of computer 100. In one embodiment, hardware resource 152 is a dedicated storage system (e.g., a Redundant Array of Independent Disks—RAID). In another embodiment, hardware resource(s) are defined as one or more hardware resources that are found in a network (i.e., are part of network 128), which is then used to connect computer 100 to another hardware resource, which may be network hardware, a server, a storage device, etc.

In another embodiment, a hardware resource is network hardware found within network 128, such as switches, routers, physical wiring, etc., which are required for computer 100 to electronically communicate with hardware resource(s) 152.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Note that in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
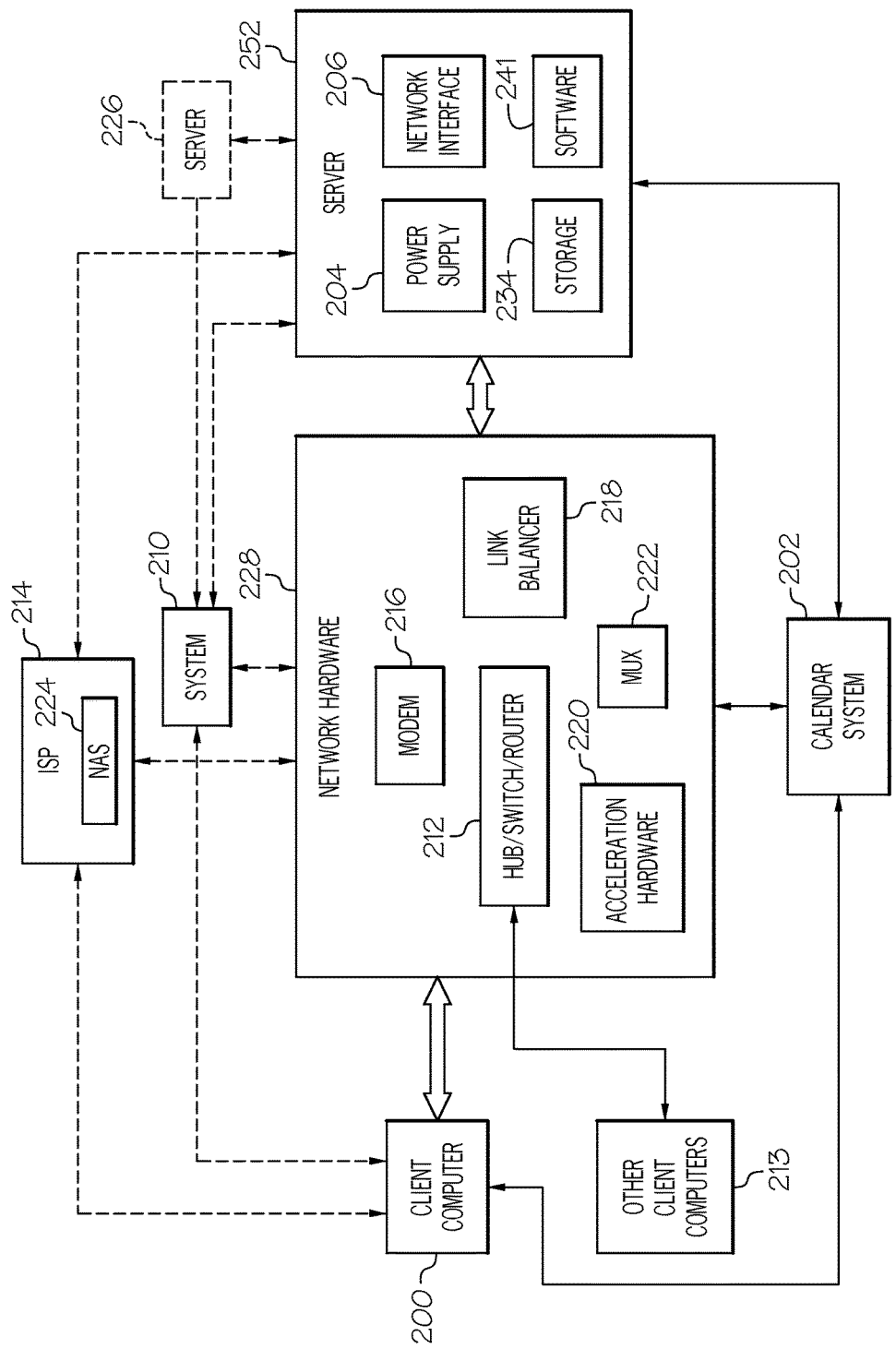
FIG. 2 illustrates additional detail of a hardware system that comprises a client computer, a server computer, and intermediary hardware resources that connect the client computer to the server computer.

With reference now to FIG. 2, additional details of a hardware system that comprises a client computer, a server computer, and intermediary hardware resources that connect the client computer to the server computer in accordance with one or more embodiments of the present invention are presented. Client computer 200 shown in FIG. 2 is analogous to computer 100 shown in FIG. 1, while network hardware 228 in FIG. 2 depicts exemplary hardware from network 128 in FIG. 1, and server 252 in FIG. 2 is analogous to hardware resource(s) 152 in FIG. 1. According to one embodiment of the present invention and as described herein, client computer 200, network hardware 228, and server 252 are required for a future meeting at which one or more participants will be using client computer 200.

Client computer 200 is associated with a calendar system 202. In one embodiment, calendar system 202 is calendar software (e.g., part of the application programs 144 shown in FIG. 1). In another embodiment, calendar system 202 is a separate computer from client computer 200. This separate computer is dedicated to maintaining calendars for multiple entities. For example, in one embodiment calendar system 202 provides an electronic calendar of scheduled events (including meetings) for a user of client computer 200, users of other client computers 213 that are able to connect to server 252, and/or a maintenance schedule for server 252 and/or network hardware 228. In this example, calendar system 202 is able to handle the competitive needs of users of the server 252 with the needs of the maintenance professionals who maintain network hardware 228 and/or server 252.

As depicted, server 252 includes hardware and software, some of which is primarily/only for the benefit/use of server 252, while others are for the benefit/use of a user of a client computer, such as client computer 200. For example, within server 252 is a power supply 204, which provides power to processors, storage devices, cooling fans, etc. found within a server. Thus, power supply 204 is for the use/benefit of server 252 itself. However, a network interface 206 is both for the benefit of the server 252 as well as a client computer (e.g., client computer 200) that is using server 252. That is, network interface 206 may benefit the server 252 by allowing server 252 to download software patches, etc. However, network interface 206 also benefits client computer 200, by enabling client computer 200 to communicate with, and thus have access to, resources within server 252.

Examples of resources within server 252 that may be useful to client computer 200 include storage 234 (defined as a hardware storage device that is analogous in functionality/purpose to hard drive 134 shown in FIG. 1), as well as software 241 (analogous to application programs 144 and/or operating system 138 shown in FIG. 1).

As will be discussed in various embodiments herein, client computer 200 (and/or a user of client computer 200) will need certain resources from server 252 at a future time/date/location. These resources may be hardware (e.g., storage 234, network interface 206, etc.) or software (e.g., software 241). If server 252 does not contain an updated version of the needed resource, then various ameliorative steps are automatically initiated by client computer 200 and/or server 252 and/or a third-party management computer system (e.g., system 210).

As noted above, the network hardware 228 is analogous to the hardware found within network 128 shown in FIG. 1. However, for the purposes of the scope of the claimed invention, hardware resources include not only the hardware resource(s) 152 depicted in FIG. 1, but also include the hardware resources depicted within network hardware 228, server 252, and/or Internet Service Provider (ISP) 214 depicted in FIG. 2. For example, the client computer 200 and/or its user will not only need hardware resources within server 252 for use at a particular time/date/location (i.e., at a future meeting), but will also need the hardware resources found within network hardware 228, in order to optimally communicate with server 252. Examples of the hardware resources found within network hardware 228 include, but are not limited to the following:

A router/switch/hub 212 provides hardware for routing messages from client computer 200 to server 252. Although the terms "router", "switch", and "hub" are often used interchangeably, they are functionally different from one another (even though they all provide the same utility of routing packets). Thus, the term "hub/switch/router" is used to identify one or more hardware resources known as a "hub", "switch", and/or "router". Nonetheless, further descriptions of a hub, switch, and router are provided below.

A hub provides a connection point to multiple devices in a network. That is, a hub is able to connect to multiple client computers and/or multiple servers, and/or to connect different segments of a local area network to one another. For example, assume that client computer 200 is sending a packet to server 252. In one embodiment, the "hub" component of hub/switch/router 212 is able to share this packet with other client computers 213 that are connected to the network that is served by network hardware 228.

A switch is a hardware device that filters and forwards packets between Local Area Network (LAN) segments. While similar to the hub, the switch selectively sends (i.e., "filters") the packets to a particular LAN segment. For example, assume that some, but not all, of the other client computers 213 are authorized to receive ("see") packets from client computer 200. The "switch" component of hub/switch/router 212 will thus send packets from client computer 200 to some, but not all, of the other client computers 213.

A router is a hardware device that forwards data packets along networks by selecting a best route for the data packets. For example, assume that client computer 200 is sending an Internet Protocol (IP) packet to server 252. If so enabled, server 252 may have an IP network that allows it to directly communicate (e.g., along certain Ethernet LANs). However, client computer 200 may also communicate with server 252 using an IP network provided by an Internet Service Provider (ISP) 214. The "router" component of hub/switch/router 212 will thus selectively send the data packet from client computer 200 directly to server 252 (via the Ethernet LAN) or indirectly to server 252 (via the ISP network that is supported by ISP 214).

Also within network hardware 228 is a modem 216. Modem 216 converts digital data packets from client computer 200 into analog signals, for transmission via a metal (usually copper) line to server 252. When transmitting data packets in a pure digital form (e.g., via a fiber optic system), a digital modulator (e.g., a baseband encoder/decoder) provides a similar function as that provided by modem 216, by encoding the data packet onto a digital carrier signal.

Also within network hardware 228 is a link balancer 218. Link balancer 218, also known as a link-load balancer, distributes incoming and outgoing packets to and from different ISP links. For example, the enterprise that owns/supports client computer 200 and/or server 252 may lease multiple ISP services, each of which has its own ISP link to the enterprise. The link balancer 218 distributes the data traffic in order to ensure evenly distributed usage of the multiple ISP links.

Also within network hardware 228 is an acceleration hardware 220. Acceleration hardware 220 is a dedicated circuit that increases the transmission speed of a data packet. This increase is accomplished by compressing the data packet, selecting a currently least-used port, and/or converting the digital baseline (i.e., the frequency of a digital carrier signal) from a lower frequency to a higher frequency.

Also within network hardware 228 is a multiplexor (MUX) 222. MUX 222 combines multiple signals (analog or digital) into a single mixed signal, which is then sent to a receiving MUX (also known as a demultiplexer, or DEMUX). By using packet header information, the DEMUX is able to deconstruct the single mixed signal into the original multiple signals. Thus, data packets from client computer 200 and other client computers 213 can be multiplexed into a single mixed signal for transmission to server 252, where the single mixed signal is demultiplexed using a DEMUX (not shown) in the server 252.

Although not specifically a part of the depicted network hardware 228, another hardware resource that is used to allow client computer 200 to communicate with server 252 is a Network Access Server (NAS) 224. NAS 224, which is a part of the infrastructure of ISP 214, is a computer server that enables ISP 214 to connect with client computer 200 and/or server 252. NAS 224 provides an interface between a local telecommunication service provider (e.g., a cable company, a phone company, a cell phone provider, etc.) and a backbone transmission line of the Internet.

As described herein, the present invention manages updating operations that occur to hardware resources, which may be part of server 252, network hardware 228, and/or ISP 214 described in FIG. 2. If such hardware resources are not properly updated when used/needed by the user of the client computer 200 during a future meeting, then conditions that are beyond a predetermined level of detriment to the future meeting and/or hardware used therefore will arise.

(Note that as used throughout the present patent application, unless otherwise defined the term "original" is used to indicate a present hardware resource, whether that hardware resource is actually "original" to the system, or is the "most recently replaced/upgraded" version of that hardware resource.)

For example, assume that the original network interface 206 in server 252 is designed to handle data traffic at a baud rate of 10 billion bits per second (10 Gbps). However, during the future meeting being held by a user of client computer 200, client computer 200 will be running a program that requires a baud rate of 100 Gbps in order to execute in an optimal manner (e.g., showing video without degraded video quality, i.e. "chattering", etc.). Thus, if the original network interface 206 (capable of handling 10 Gbps) is not replaced with a new network interface 206 having a baud rate of 100 Gbps, then adverse/detrimental conditions (i.e., an unacceptable level of detriment) to the future meeting will arise (i.e., video will chatter, data will be retrieved too slowly for seamless integration into a display, etc.).

In another embodiment, assume that storage 234 in server 252 is able to store only 100 million bytes (100 MB) of data, but that an application running on client computer 200 during the future meeting needs 500 MB of storage. Assume further that, in one embodiment, this application is unable to execute at all without the requisite 500 MB of storage room from storage 234. In another embodiment, however, this application is able to execute with just the 100 MB of storage room, but performance will be degraded due to excessive page swaps, etc. In either embodiment, this software will run at a reduced level (which is an adverse situation that is detrimental to the future meeting) if the storage 234 is unable to provide the 500 MB of needed storage. Thus, the 100 MB storage 234 needs to be replaced/updated with a new 500 MB storage 234, in order to avoid an unacceptable level of detriment to the future meeting.

In another embodiment, assume that the original router/switch/hub 212 in network hardware 228 needs to be updated in order for operations performed by client computer 200 to be optimal. For example, assume that router/switch/hub 212 is able to direct data packets according to an early protocol version (e.g., IPv4), but client computer 200 wants to communicate with server 252 using IPv6 during the future meeting. Unless router/switch/hub 212 is updated (or replaced with a new router/switch/hub 212) to accommodate IPv6, then either 1) the data packets will not go through, or 2) a "workaround" (i.e., intermediate transmission protocol conversion process) will have to occur. Either scenario is adverse (i.e., not optimal), and thus will be detrimental to the future meeting.

In another embodiment, assume that the original modem 216 within network hardware 228 is designed to run at a certain speed (e.g., 1200 bits per second—bps), but that an application within client computer 200 to be used during the future meeting is designed to use a modem 216 that runs at 2400 bps. If the original modem 216 (running at 1200 bps) is not replaced/upgraded/updated with a new modem 216 (running at 2400 bps), then this application will be compromised (another adverse/detrimental condition to the future meeting).

In another embodiment, assume that the original link balancer 218 within network hardware 228 is designed to direct traffic to only 2 different ISP links. However, a user of client computer 200 may desire to access resources from 4 different ISP links, which are now available to the enterprise that owns the network hardware 228, during the future meeting. Unless the original link balancer 218 (handling 2

ISP links) is replaced with an updated link balancer (handling 4 ISP links), then performance is compromised (another detrimental condition to the future meeting).

In another embodiment, assume that the original acceleration hardware 200 within network hardware 228 is able to provide a 10× improvement in transmission speed, but the user and/or application using client computer 200 during the future meeting needs the transmission speed to be increases by 100×. Unless the original acceleration hardware 220 is replaced (with a new acceleration hardware 220) or upgraded to provide the 100× improvement, then the compromised performance will be detrimental to the future meeting.

In another embodiment, assume that the original MUX 222 within network hardware 228 is able to a multiplex 10 channels, but client computer 200 (and/or an application running thereon) needs to multiplex 100 channels. Unless the original MUX 222 (handling 10 channels) is replaced with a new MUX 222 (handling 100 channels), then the lower performance of the original MUX 222 will be detrimental to the future meeting.

In another embodiment, assume that the original NAS 224 within ISP 214 is able to provide an interface between a local cable company and the Internet, but not between a cell phone provider and the Internet. Unless the original NAS 224 is updated/replaced with a new NAS 224, which is able to provide an interface between the cell phone provider and the Internet, then there will be a level of detriment to the future meeting that exceeds a predetermined limit.

Figure 3:
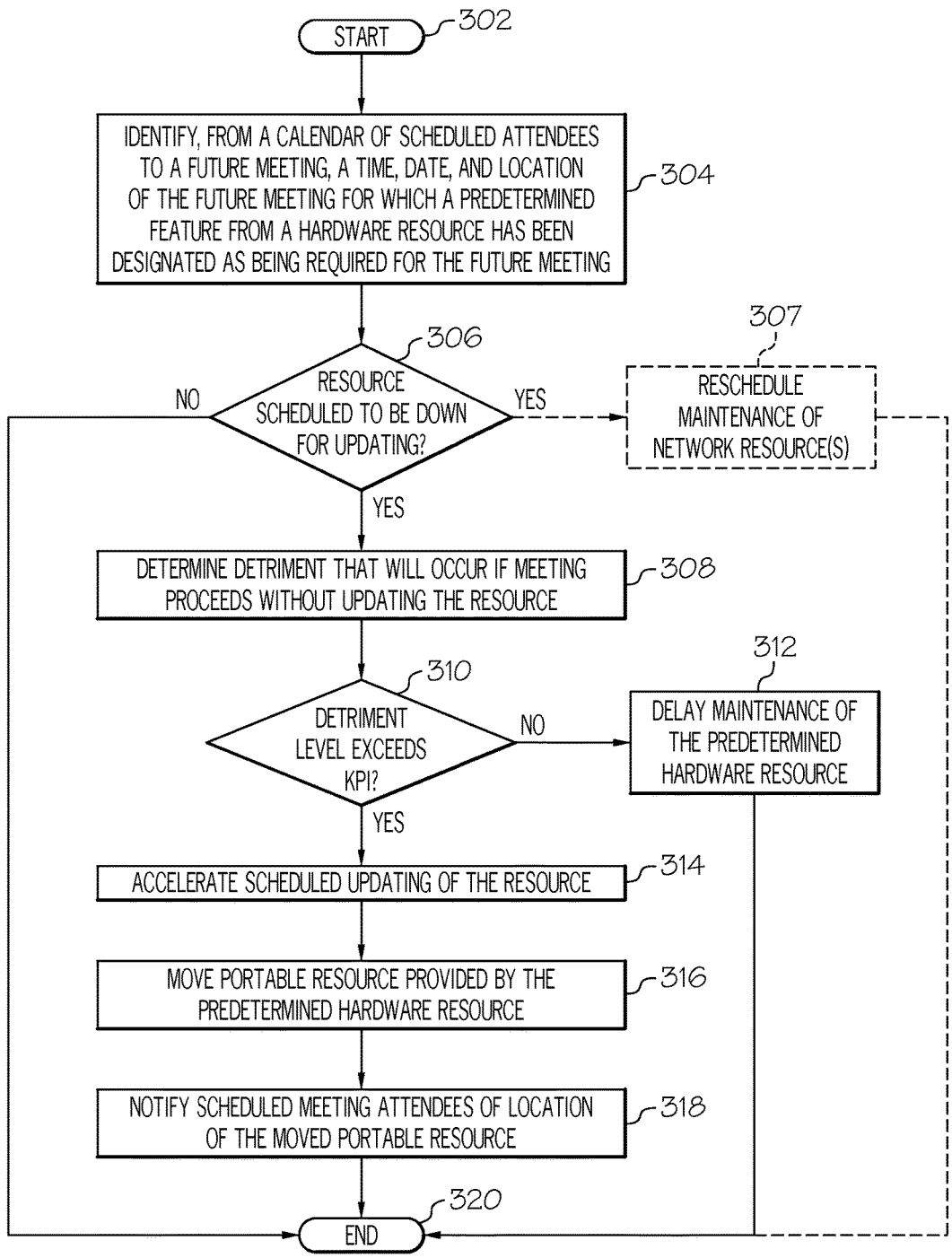
FIG. 3 is a high-level flow chart of one or more hardware-executed steps taken to manage update operations for a hardware resource, in order to ensure hardware resource availability at a particular place during a specific time and date.

With reference now to FIG. 3, a high-level flow chart of one or more hardware-executed steps taken to manage update operations for a hardware resource, in order to ensure hardware resource availability at a particular place during a specific time and date of a future meeting, is presented.

After initiator block 302, one or more processors identify, from a calendar of scheduled attendees to a future meeting, a time, date, and location of the future meeting for which a predetermined feature from a hardware resource has been designated as being required for the future meeting (block 304). For example, client computer 200, calendar system 202, server 252, or another supervisory computer system (e.g., a supervisor using system 210, which is able to communicate with some or all of the other hardware depicted in FIG. 2), determines/identifies which hardware resources will be needed during a future scheduled/calendared meeting. In one embodiment, this determination/identification is performed by examining entries into an electronic calendar. For example, a moderator, participant, and/or organizer of the future meeting may enter into the electronic calendar that "Server 252 needs to provide 500 MB of storage for this meeting". The system 210 or other hardware logic will deduce that storage 234 needs to provide the 500 MB of space, based on the entry "Server 252" (thus indicating which server will be used) and "provide 500 MB of storage" (thus indicating the need for a mass storage device, such as storage 234).

Similarly, system 210 or other logic may deduce what resources are needed by a history of resource usage by the person who made the calendar entry. For example, assume that "Person A" has entered the calendar entry for a future meeting, and that "Person A" has used 500 MB of storage for every weekly meeting he has scheduled during the past year. System 210 can thus confidently predict that if server 252 will be supporting Person A's use of client computer 200 during the next scheduled meeting, then storage 234 will need to be able to provide 500 MB of storage space.

As described in query block 306, a query is made to determine whether the predetermined feature of the hardware resource is scheduled for updating during the time and date of the future meeting (and/or at the identified location). That is, assume that in block 304, the determination was made that the meeting at the time/date/location will require 500 MB of storage space, but that the system 210 in FIG. 2 already has planned on upgrading storage 234 by replacing the old 100 MB storage 234 with a new 500 MB storage 234. As such, system 210 also knows (e.g., according to a maintenance calendar entry in calendar system 202) when this upgrade is scheduled to occur. In one embodiment, the upgrade to storage 234 is scheduled to occur before the future meeting; in one embodiment, the upgrade to storage 234 is scheduled to occur at the same time as the future meeting; and in one embodiment, the upgrade to storage 234 is scheduled to occur after the future meeting.

If the upgrade to storage 234 is scheduled to occur before the scheduled meeting, then there is no problem, since the needed 500 MB of storage will be available.

If the upgrade to storage 234 is scheduled to occur during the scheduled meeting, then not only will the 500 MB of storage from the server 252 in FIG. 2 not be available, but storage 234 itself will not be available. Thus, the system 210 will have to locate a substitute for storage 234 (e.g., in another server such as server 226 shown in FIG. 2, or from other client computers 213).

If the upgrade to storage 234 is scheduled to occur after the scheduled meeting, then storage 234 will be able to provide the less-than-optimal 500 MB of storage, but will at least be able to provide 100 MB of storage. Thus, the a supervisory system (e.g., system 210) will have to either 1) locate a substitute 500 MB storage from another server/client, or 2) provide a workaround for using the 100 MB storage 234 (e.g., by initiating page swapping, etc.).

As described in block 307, in one embodiment the hardware resource that is scheduled to undergo maintenance at the same time that the future meeting is planned is one or more network resources (see network hardware 228 in FIG. 2) that are to be used to connect to a server or other resources. Thus, in this embodiment, in response to determining that the predetermined feature of the hardware resource (e.g., the network hardware resource) is scheduled for updating during the time and date of the future meeting at said location, the updating of the predetermined feature of the hardware resource is rescheduled, and the process ends at terminator block 320.

As described in block 308 of FIG. 3, one or more processors then determine a level of detriment that will occur to the future meeting if the future meeting proceeds without the updating of the predetermined feature from the hardware resource, wherein the level of detriment is determined by a client device (or a supervisory system, such as system 210) determining a level of system collaboration capability between the client device and the hardware resource. For example, if the level of detriment that will occur (if the 100 MB storage 234 is used) is that the speed of graphics shown by client computer 200 will be slowed down by 50% due to the resources in client computer 200 and server 252 having a low level of system collaboration capability (i.e., the hardware/software used in client computer 200 is not optimally matched to the hardware/software provided by server 252), then the level of detriment is 50%. Assume that this 50% level meets a Key Performance Indicator (KPI) for the graphics program being used by client computer 200 during the future meeting. That is, if video is displayed at a speed that is 50% of the original design, then 50% of the maximum parameter, and thus the KPI, is being met. Thus, a query is made in query block 310 as to whether or not this 50% degradation exceeds the KPI for the graphics program/future meeting. If the upgrade to the storage 234 was originally scheduled for the same time/date and/or location as the future meeting or thereafter, but the KPI is not exceeded by using the original 100 MB storage 234, then the future meeting can proceed using the 100 MB storage 234, and maintenance of the storage 234 (e.g., upgrading to 500 MB) is delayed until (or allowed to occur) after the future meeting (block 312).

However, if using the 100 MB storage 234 results in the KPI not being met (e.g., using the 100 MB storage 234 causes a 70% reduction in efficiency in running the graphics program, thus not meeting the 50% KPI benchmark), then one or more corrective steps are taken.

As described in block 314, one such step is to accelerate the updating of the resource. That is, if the 100 MB storage 234 was scheduled to be replaced either during or after the future meeting, then this scheduled replacement is moved to a time/date that is before the future meeting.

Another corrective step that is taken (e.g., by processors within system 210) is to identify and move a portable resource from the 100 MB storage 234. For example, assume that storage 234 has sufficient room to store 100 MB of graphics data that will be needed at the future meeting, but is simply too slow (has an access rate that is less than that required by a particular graphics program). One workaround is for the supervisor to preemptively move the needed 100 MB of graphics data to local memory within client computer 200 just before the scheduled future meeting, thus making the requisite 100 MB of graphics data readily (and rapidly) available to client computer 200.

As described in block 318, if another resource is to be used as a replacement for the deficient resource, or if the portable resource (i.e., data) is moved, then a notice is sent to attendees of the meeting (identified by the calendar system 202) informing them of the new location for this new/moved resource. The process ends at terminator block 320.

Thus, as described herein, in one embodiment of the present invention, the hardware resource that is needed (i.e., has been predetermined to be required for the future meeting) is a network system that connects the client device to a server that is needed by the future meeting.

In one embodiment of the present invention, the level of detriment that will occur to the future meeting is based on a Key Performance Indicator (KPI) of the system collaboration capability between the client device and the hardware resource. In this embodiment, one or more processors determine whether or not the level of detriment exceeds the KPI of the system collaboration capability between the client device and the hardware resource. In response to determining that the level of detriment does not exceed the KPI of the system collaboration capability between the client device and the hardware resource, one or more processors issues an instruction to delay the updating of the hardware resource until after the future meeting. For example, assume that client computer 200 in FIG. 2 is able to communicate with network hardware 228 and/or server 252 at 10 Gbps. If network hardware 228 and/or server 252 are able to offer bandwidths that meet or exceed 10 Gbps, then there is no problem, and the updating of interface hardware in network hardware 228 and/or server 252 to 100 Gbps can be delayed until after the future meeting occurs. However, if the client computer 200 needs to communicate at 80 Gbps with network hardware 228 and/or server 252, then the interface hardware in network hardware 228 and/or server 252 needs to be upgraded before the future meeting occurs. This updated maintenance schedule is then initiated by the system 210.

As described herein, in one embodiment the needed feature from a hardware resource is a portable resource, such as software (e.g., data, an application, a virtual machine, etc.) or hardware (e.g., a flash drive, a dongle, an external hard drive, etc.). A determination is made, by one or more processors, whether or not the level of the KPI of the hardware resource meets a predefined level. In response to determining that the level of the KPI of the hardware resource fails to meet the predefined level, one or more processors issue instructions to move the portable resource from said hardware resource to another hardware resource. For example, assume that the predetermined feature (required for the future meeting) is a set of graphics data. If network hardware 228 and/or server 252 are not able to provide this graphics data at the necessary speed, then this graphics data can be moved to another server (not depicted) that is able to do so at the necessary speed.

Assume that in another embodiment that the requisite predetermined feature needed at the future meeting is portable hardware (e.g., assume that storage 234 in FIG. 2 is a portable storage device). Assume further that this portable storage device is fast enough (e.g., has an access speed and/or a transmission speed that exceed levels required by client computer 200), but network hardware 228 creates a bottleneck that greatly increases the amount of time needed to access the data on the portable storage device. Thus, if the portable storage device can be connected to another device (e.g., one of the other client computers 213, or client computer 200 itself), then (assuming that there is a fast connection between the client computer 200 and the portable storage device), this hardware will be relocated to the new device.

In one embodiment of the present invention, the hardware resource is a server that comprises a hardware subcomponent. In this embodiment, the method further comprises: determining, by one or more processors, whether or not the hardware subcomponent is the predetermined feature from the hardware resource that has been designated as being required for the future meeting; and in response to determining that the hardware subcomponent is not the predetermined feature from the hardware resource that has been designated as being required for the future meeting, rescheduling, by one or more processors, the future meeting back to an original time and date of the future meeting. That is, in one embodiment the future meeting needs a particular hardware subcomponent (e.g., software 241 in server 252 shown in FIG. 2). However, the scheduled maintenance to server 252 may simply be to replace a mass storage system, such as storage 234, which is not needed by client computer 200 during the future meeting (assuming that software 241 is stored in another storage device on server 252). Assuming that storage 234 can be "hot swapped" (i.e., replaced while leaving server 252 turned on), then there is no conflict between the maintenance schedule for 252 and the needs of client computer 200 during the future meeting. Thus, the maintenance of server 252 (replacement of storage 234) can occur during the future meeting. However, without calendar system 202, and/or system 210, there would be no way to know that no such conflict exists.

As described herein, in one embodiment the hardware resource is a server, wherein the predetermined feature from the hardware resource is a specific software application that is stored within the server, and wherein the method further comprises: moving, by one or more processors, the specific software application to another hardware resource; and transmitting, by one or more processors and to the scheduled attendees, a link to said another hardware resource to which the specific software application has been moved. In one embodiment, this specific software application generates a virtual machine that is used by the future meeting.

In one embodiment of the present invention, the hardware resource is a server, wherein the predetermined feature of the hardware resource is specific data that is stored within the server, and wherein the method further comprises: moving, by one or more processors, the specific data to another hardware resource; and transmitting, by one or more processors and to the scheduled attendees, a link to said another hardware resource in which the specific data has been moved.

In one embodiment of the present invention, resource usage is prioritized in a sliding matrix. For example, assume that there are two client computers, each of which is to be used at a different future meeting, and both of which are connected to a same server. The topic and/or organizer of these two future meetings are also different. In this embodiment, if the first meeting is deemed to be more important than the second meeting (according to a predetermined level of importance), then any resource updates that are needed by the first meeting are performed before resource updates needed by the second meeting. That is, the first meeting may be assigned a level of importance of "1" by a user, while the second meeting may be assigned a lower level of importance "2" by the same or another user. Thus, assume that client computer 200 is to be used at a first meeting, and one of the other client computers 213 is to be used at a second meeting, but 1) the first meeting and the second meeting will be occurring at the same time, and 2) the first meeting and the second meeting will be using different sub-resources from server 252. That is, the more important first meeting will be using storage 234, while the less important second meeting will be using software 241. As such, system 210 will schedule the updating to server 234 (which updating is needed by the first meeting) before the future meeting time, while allowing the updating to the software 241 (which updating is needed by the second meeting) to occur after the scheduled future meeting time (thus forcing the second meeting to use the obsolete version of software 241).

While the present invention has been illustrated using a client device that needs to access a server, in one embodiment the server may need to access another server in order to fulfill the needs of the client device. That is, the user of client computer 200 may know that he needs to use server 252 during his future meeting, but may have no idea that server 252 needs to access server 226 (shown in FIG. 2) in order to function according to the needs of client computer 200. Thus, utilizing the processes described herein, system 210 will adjust the maintenance schedule of server 226 (e.g., moving it ahead of the future meeting during which client computer 200 will be used) if failure to do so will result in detriment to that future meeting (i.e., server 252 will not provide client computer 200 with the resources it needs during the future meeting).

Thus, as described herein, in one embodiment of the present invention, a method, system, and/or computer program product manages update operations for an infrastructure resource. In one embodiment, the infrastructure is network hardware that connects a client computer to a server. In one embodiment, the method comprises: identifying, by one or more processors and from a calendar of scheduled attendees to a future meeting, a time, date, and meeting location of the future meeting; identifying, by one or more processors, an infrastructure between the meeting location and a hardware resource, wherein a predetermined feature of an infrastructure resource has been designated as being required for accessing the hardware resource during the future meeting; determining, by one or more processors, whether the predetermined feature of the infrastructure resource is scheduled for updating during the time and date of the future meeting at said location; and in response to determining that the predetermined feature of the infrastructure resource is scheduled for updating during the time and date of the future meeting at said location, rescheduling said updating of the predetermined feature of the infrastructure resource.

In one embodiment of the present invention, the infrastructure resource is a network system that connects the client device to a server, where the server is the hardware resource, and where the server has been predetermined to be required for the future meeting.

In one embodiment of the present invention, wherein the server comprises a hardware subcomponent, and the method further comprises: scheduling, by one or more processors, an update to the server to occur during the future meeting; determining, by one or more processors, whether or not the hardware subcomponent of the server has been designated as being required for the future meeting; and in response to determining that the hardware subcomponent of the server has not been designated as being required for the future meeting, rescheduling, by one or more processors, a scheduled update to the server back to an original time and date of the future meeting.

In one embodiment of the present invention, a specific software application is stored within the server, and the method further comprises: scheduling, by one or more processors, an update to the server to occur during the future meeting; in response to detecting that the update to the server is scheduled to occur during the future meeting, moving, by one or more processors, the specific software application to another server; and transmitting, by one or more processors and to the scheduled attendees, a link to said another server to which the specific software application has been moved.

In one embodiment of the present invention, the specific software application generates a virtual machine that is used by the future meeting.

In one embodiment of the present invention, specific data is stored within the server, and the method further comprises: scheduling, by one or more processors, an update to the server to occur during the future meeting; in response to detecting that the update to the server is scheduled to occur during the future meeting, moving, by one or more processors, the specific data to another server; and transmitting, by one or more processors and to the scheduled attendees, a link to said another server in which the specific data has been moved.

In one embodiment of the present invention, a client device is scheduled for use at the meeting location during the future meeting, and the method further comprises: determining, by one or more processors, a level of detriment that will occur to the future meeting if the future meeting proceeds without the updating of the predetermined feature from the infrastructure resource; and adjusting, by one or more processors, a schedule for updating the infrastructure resource according to the level of detriment that will occur to the future meeting if the future meeting proceeds without the updating of the predetermined feature from the infrastructure resource.

In one embodiment of the present invention, the level of detriment is determined by determining a level of system collaboration capability between the client device and the infrastructure resource.

In one embodiment of the present invention, the level of detriment that will occur to the future meeting is based on a Key Performance Indicator (KPI) of the system collaboration capability between the client device and the infrastructure resource, and the method further comprises: determining, by one or more processors, whether or not the level of detriment exceeds the KPI of the system collaboration capability between the client device and the infrastructure resource; and in response to determining that the level of detriment does not exceed the KPI of the system collaboration capability between the client device and the infrastructure resource, issuing, by one or more processors, an instruction to delay the updating of the infrastructure resource until after the future meeting.

In one embodiment of the present invention, the level of detriment to the future meeting is based on a Key Performance Indicator (KPI) of the infrastructure resource, and the method further comprises: determining, by one or more processors, whether or not the level of detriment to the future meeting exceeds the KPI of the infrastructure resource by a predefined amount; and in response to determining that the level of detriment to the future meeting exceeds the KPI of the infrastructure resource by the predefined amount, issuing, by one or more processors, instructions to accelerate updating of the infrastructure resource to occur before the future meeting.

In one embodiment of the present invention, the level of detriment to the future meeting is based on a Key Performance Indicator (KPI) of a hardware resource from a server that is needed during the future meeting, where the hardware resource from the server is a portable resource, and the method further comprises: determining, by one or more processors, whether or not the level of the KPI of the hardware resource from the server meets a predefined level; and in response to determining that the level of the KPI of the hardware resource from the server fails to meet the predefined level, issuing, by one or more processors, instructions to move the portable resource from said server to another server.

In one embodiment of the present invention, the infrastructure resource is a network system that connects the client device to a server that has been predetermined to be required for the future meeting, where the level of detriment is determined by determining a level of system collaboration capability between the client device and the infrastructure resource, and where the system collaboration capability is based on the infrastructure resource being capable of providing requisite data to the client device during the future meeting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method to manage update operations for an infrastructure resource, the method comprising:
   identifying, by one or more processors and from a calendar of scheduled attendees to a future meeting, a time, date, and meeting location of the future meeting, wherein a client device is scheduled for use at the meeting location during the future meeting;
   identifying, by one or more processors, an infrastructure between the meeting location and a hardware resource, wherein a predetermined feature of an infrastructure resource has been designated as being required for accessing the hardware resource during the future meeting, wherein the infrastructure resource is a network system that connects a client device to a server, wherein the server comprises the hardware resource, and wherein the server has been predetermined to be required for the future meeting;
   determining, by one or more processors, whether the predetermined feature of the infrastructure resource is scheduled for updating during the time and date of the future meeting at said meeting location;
   in response to determining that the predetermined feature of the infrastructure resource is scheduled for updating during the time and date of the future meeting at said meeting location, rescheduling, by one or more processors, said updating of the predetermined feature of the infrastructure resource;
   determining, by one or more processors, a level of detriment that will occur to the future meeting if the future meeting proceeds without the updating of the predetermined feature of the infrastructure resource, wherein the level of detriment is defined and caused by a reduction in a quality of data received from the hardware resource caused by not updating the predetermined feature of the infrastructure resource, wherein the level of detriment to the future meeting is based on a Key Performance Indicator (KPI) of the hardware resource that is needed during the future meeting, and wherein the hardware resource is a portable resource;
   in response to determining that the level of detriment exceeds the KPI,
      adjusting, by one or more processors, a schedule for the updating of the predetermined feature of the infrastructure resource;
      issuing, by one or more processors, instructions to move the portable resource from said server to another server;

in response to determining that the level of detriment does not exceed the KPI,
  updating, by one or more processors, the predetermined feature of the infrastructure resource; and
  delaying maintenance of the predetermined hardware resource.

2. The method of claim 1, wherein the server comprises a particular hardware subcomponent, and wherein the method further comprises:
  scheduling, by one or more processors, an update to the server to occur during the future meeting;
  determining, by one or more processors, whether or not the particular hardware subcomponent of the server has been designated as being required for the future meeting; and
  in response to determining that the particular hardware subcomponent of the server has not been designated as being required for the future meeting, authorizing, by one or more processors, a scheduled update to the server to occur during the future meeting, wherein said scheduled update to the server updates the particular hardware subcomponent.

3. The method of claim 1, wherein a specific software application is stored within the server, and wherein the method further comprises:
  scheduling, by one or more processors, an update to the server to occur during the future meeting;
  in response to detecting that the update to the server is scheduled to occur during the future meeting, moving, by one or more processors, the specific software application to another server; and
  transmitting, by one or more processors and to the scheduled attendees, a link to said another server to which the specific software application has been moved.

4. The method of claim 3, wherein the specific software application generates a virtual machine that is used by the future meeting.

5. The method of claim 1, wherein specific data is stored within the server, and wherein the method further comprises:
  scheduling, by one or more processors, an update to the server to occur during the future meeting;
  in response to detecting that the update to the server is scheduled to occur during the future meeting, moving, by one or more processors, the specific data to another server; and
  transmitting, by one or more processors and to the scheduled attendees, a link to said another server in which the specific data has been moved.

6. The method of claim 1, wherein the infrastructure resource is a network system that connects the client device to a server that has been predetermined to be required for the future meeting, wherein the level of detriment is determined by determining a level of system collaboration capability between the client device and the infrastructure resource, and wherein the system collaboration capability is based on the infrastructure resource being capable of providing requisite data to the client device during the future meeting.

7. A computer program product for managing update operations for a hardware resource, the computer program product comprising a computer readable storage medium having program code embodied therewith, the program code readable and executable by a processor to perform a method comprising:
  identifying, from a calendar of scheduled attendees to a future meeting, a time, date, and meeting location of the future meeting;
  identifying an infrastructure between the meeting location and a hardware resource, wherein a predetermined feature of an infrastructure resource has been designated as being required for accessing the hardware resource during the future meeting, wherein a client device is scheduled for use at the meeting location during the future meeting, wherein the infrastructure resource is a network system that connects a client device to a server, wherein the server comprises the hardware resource, and wherein the server has been predetermined to be required for the future meeting;
  determining whether the predetermined feature of the infrastructure resource is scheduled for updating during the time and date of the future meeting at said meeting location;
  in response to determining that the predetermined feature of the infrastructure resource is scheduled for updating during the time and date of the future meeting at said meeting location, rescheduling said updating of the predetermined feature of the infrastructure resource;
  determining a level of detriment that will occur to the future meeting if the future meeting proceeds without the updating of the predetermined feature of the infrastructure resource, wherein the level of detriment is defined by a reduction in performance to data received from the hardware resource caused by not updating the predetermined feature of the infrastructure resource, wherein the level of detriment to the future meeting is based on a Key Performance Indicator (KPI) of the hardware resource that is needed during the future meeting, and wherein the hardware resource is a portable resource;
  in response to determining that the level of detriment exceeds the KPI,
    adjusting, by one or more processors, a schedule for the updating of the predetermined feature of the infrastructure resource;
    issuing, by one or more processors, instructions to move the portable resource from said server to another server;
  in response to determining that the level of detriment does not exceed the KPI,
    updating, by one or more processors, the predetermined feature of the infrastructure resource; and
    delaying maintenance of the predetermined hardware resource.

8. The computer program product of claim 7, wherein the server comprises a particular hardware subcomponent, and wherein the method further comprises:
  scheduling an update to the server to occur during the future meeting;
  determining whether or not the particular hardware subcomponent of the server has been designated as being required for the future meeting; and
  in response to determining that the particular hardware subcomponent of the server has not been designated as being required for the future meeting, authorizing a scheduled update to the server to occur during the future meeting, wherein said scheduled update to the server updates the particular hardware subcomponent.

9. The computer program product of claim 7, wherein a specific software application is stored within the server, and wherein the method further comprises:
  scheduling an update to the server to occur during the future meeting;

in response to detecting that the update to the server is scheduled to occur during the future meeting, moving the specific software application to another server; and transmitting, to the scheduled attendees, a link to said another server to which the specific software application has been moved.

10. The computer program product of claim 9, wherein the specific software application generates a virtual machine that is used by the future meeting.

11. The computer program product of claim 7, wherein specific data is stored within the server, and wherein the method further comprises:

scheduling an update to the server to occur during the future meeting;

in response to detecting that the update to the server is scheduled to occur during the future meeting, moving the specific data to another server; and transmitting, to the scheduled attendees, a link to said another server in which the specific data has been moved.

* * * * *